(12) United States Patent
Yaffe

(10) Patent No.: US 10,065,696 B2
(45) Date of Patent: Sep. 4, 2018

(54) VEHICLE SADDLEBAG LATCH DEVICE, ASSEMBLY, AND METHOD

(71) Applicant: Paul Yaffe, Phoenix, AZ (US)

(72) Inventor: Paul Yaffe, Phoenix, AZ (US)

( * ) Notice: Subject to any disclaimer, the term of this patent is extended or adjusted under 35 U.S.C. 154(b) by 431 days.

(21) Appl. No.: 14/512,221

(22) Filed: Oct. 10, 2014

(65) Prior Publication Data

US 2016/0102485 A1 Apr. 14, 2016

(51) Int. Cl.
*E05C 3/06* (2006.01)
*B62J 9/00* (2006.01)
*E05B 65/52* (2006.01)
*E05C 9/02* (2006.01)
*B62J 7/08* (2006.01)

(52) U.S. Cl.
CPC . *B62J 9/00* (2013.01); *B62J 7/08* (2013.01); *E05B 65/5238* (2013.01); *E05C 9/02* (2013.01)

(58) Field of Classification Search
CPC ....... B62J 9/00; B62J 7/00; E05C 1/16; E05C 3/041; E05C 3/042; Y10S 292/30
USPC ......................................................... 292/200
See application file for complete search history.

(56) References Cited

U.S. PATENT DOCUMENTS

| | | | | |
|---|---|---|---|---|
| 3,000,660 A | * | 9/1961 | Lewis, Jr. | G05G 1/12 16/413 |
| 4,435,966 A | * | 3/1984 | Craig | E05B 65/5276 220/210 |
| 6,227,581 B1 | * | 5/2001 | Lambert | E05C 19/14 292/100 |
| 6,631,835 B2 | * | 10/2003 | Fang | B62J 9/001 224/315 |
| 2008/0078065 A1 | * | 4/2008 | Huang | E05B 1/003 16/422 |

* cited by examiner

*Primary Examiner* — Mark A Williams
(74) *Attorney, Agent, or Firm* — Ice Miller LLP

(57) ABSTRACT

A saddlebag latch device allowing access to an interior space of a saddlebag comprises a shaft member rotatable about an axis. The shaft member comprises a first end portion for positioning at an interior location of a saddlebag lid and a second end portion distal from the first end portion for positioning at an exterior location of the saddlebag lid. The second end portion comprises a handle protrusion and at least one surface configured to engage a handle member such that rotation of the handle member about the axis causes rotation of the shaft member.

17 Claims, 9 Drawing Sheets

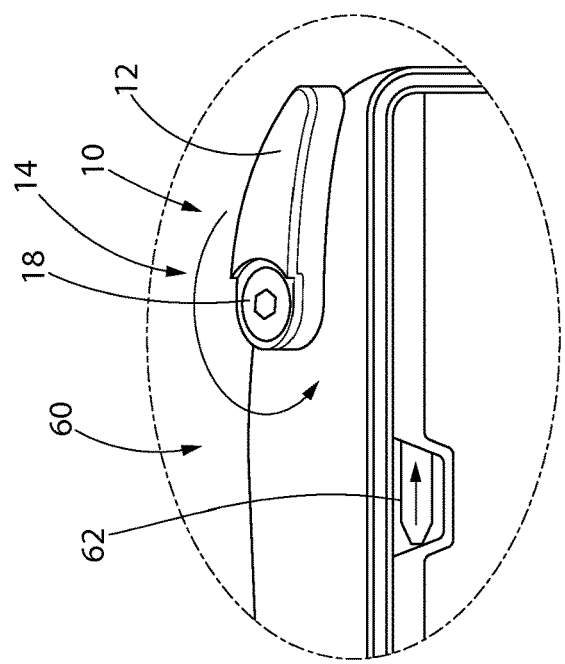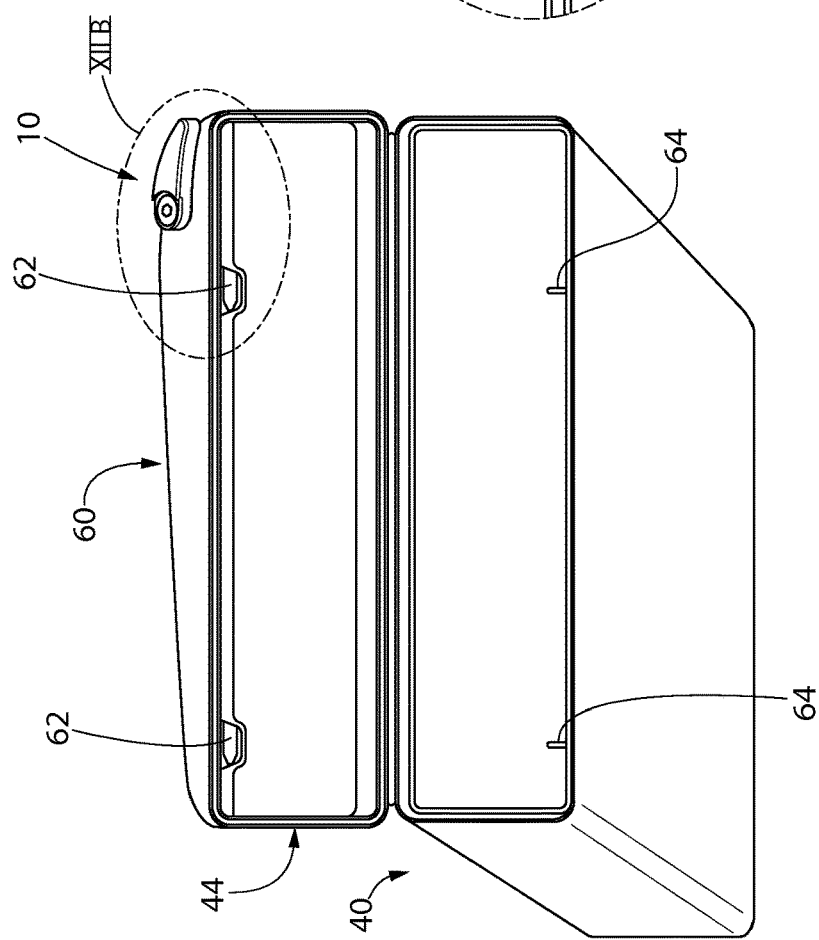

VEHICLE SADDLEBAG LATCH DEVICE, ASSEMBLY, AND METHOD

BACKGROUND

Modern touring motorcycles often have panniers or saddlebags mounted on either side of the rear of the motorcycle, typically below and behind the rider, to facilitate long or short term storage on the motorcycle. While soft saddlebags are typically made from textile or leather, hard saddlebags are commonly formed from a polymer or composite material, such as ABS. The contents located at an interior space of a hard saddlebag may be accessed by lifting or otherwise opening a saddlebag lid. The lid and the lower portion of a hard saddlebag are typically connected by a hinge mechanism at one side of the lid and a latch mechanism at the opposite side. Each saddlebag may be locked through the latch mechanism or a separate lock to secure the contents located at the interior space. However, the structure of conventional latch handles and latch mechanisms creates challenges with regard to quick and simple access to the interior space of a saddlebag. Therefore, there exists a need for a latch assembly permitting quick and simple saddlebag content access. Further, there exists a need for a handle portion of the latch assembly to be removable or replaceable in order to improve access to saddlebag contents and to allow repair, interchangeability, and customization of such exterior structures.

SUMMARY

In accordance with an aspect of the present disclosure, a saddlebag latch device allowing access to an interior space of a saddlebag is provided comprising a shaft member rotatable about an axis. The shaft member comprises a first end portion for positioning at an interior location of a saddlebag lid and a second end portion distal from the first end portion for positioning at an exterior location of the saddlebag lid. The second end portion comprises a handle protrusion and at least one surface configured to engage a handle member such that rotation of the handle member about the axis causes rotation of the shaft member.

The handle protrusion may extend in a direction parallel with the axis. The handle protrusion may further extend in a direction transverse to the axis to engage the handle member such that rotation of the handle member about the axis causes rotation of the shaft member. The at least one surface may comprise two transversely separated surfaces to engage the handle member at two transversely separated locations.

In accordance with further aspects of the present disclosure, a saddlebag latch assembly allowing access to an interior space of a saddlebag is provided comprising a handle member comprising at least one first engagement surface and a shaft member rotatable about an axis. The shaft member comprises a first end portion for positioning at an interior location of a saddlebag lid and a second end portion distal from the first end portion for positioning at an exterior location of the saddlebag lid. The second end portion comprises a second end protrusion and at least one second engagement surface configured to engage the at least one first engagement surface of the handle member such that rotation of the handle member about the axis causes rotation of the shaft member.

The second end protrusion may extend in a direction parallel with the axis. The second end protrusion may further extend in a direction transverse to the axis to engage the handle member such that rotation of the handle member about the axis causes rotation of the shaft member. The handle member may further comprise a recess extending in a direction parallel with the axis. The recess may comprise the at least one first engagement surface. The recess may comprise two engagement surfaces to engage two transversely separated second end protrusion engagement surfaces.

The saddlebag latch assembly may further comprise a latch mechanism having at least one securing member to maintain a closed state of the saddlebag, wherein the rotation of the shaft member results in operation of the latch mechanism to allow opening of the saddlebag lid. The latch mechanism may comprise at least two securing members each extendable in a direction substantially perpendicular to the axis to releasably engage at least two anchor members.

In accordance with further aspects of the present disclosure, a method of coupling a handle member to a shaft member to form a saddlebag latch assembly allowing access to an interior space of a saddlebag is provided comprising providing a handle member having an attachment portion, providing a shaft member rotatable about an axis and comprising a first end portion having a latch mechanism attachment portion and a second end portion having a protrusion, inserting the shaft member through a portion of a saddlebag such that the first end portion is disposed at an inside location of the saddlebag and the second end portion is disposed at an outside location of the saddlebag, and coupling the attachment portion of the handle member to the protrusion such that rotation of the handle member about the axis causes rotation of the latch mechanism attachment portion.

The protrusion may extend in a direction parallel to said axis. The protrusion may further extend in a direction transverse to the axis to engage the handle member such that rotation of the handle member about the axis causes rotation of the shaft member. The coupling may further comprise coupling the attachment portion of the handle member to the protrusion in a recess of the attachment portion extending in a direction parallel with the axis. The recess may comprise the at least one first engagement surface. The recess may comprise two engagement surfaces to engage two transversely separated protrusion engagement surfaces.

BRIEF DESCRIPTION OF THE FIGURES

While the specification concludes with claims particularly pointing out and distinctly claiming the present disclosure, it is believed that the present disclosure will be better understood from the following description in conjunction with the accompanying Drawing Figures, in which like reference numerals identify like elements, and wherein:

FIG. 12A is a top perspective view of a vehicle saddlebag latch assembly in accordance with aspects of the present disclosure;

FIG. 12B is an enlarged top perspective view of a vehicle saddlebag latch assembly in accordance with aspects of the present disclosure;

DETAILED DESCRIPTION

In the following detailed description of the preferred embodiment, reference is made to the accompanying drawings that form a part hereof, and in which is shown by way of illustration, and not by way of limitation, a specific preferred embodiment in which the disclosure may be practiced. It is to be understood that other embodiments may be utilized and that changes may be made without departing from the spirit and scope of the present disclosure.

Figure 1:
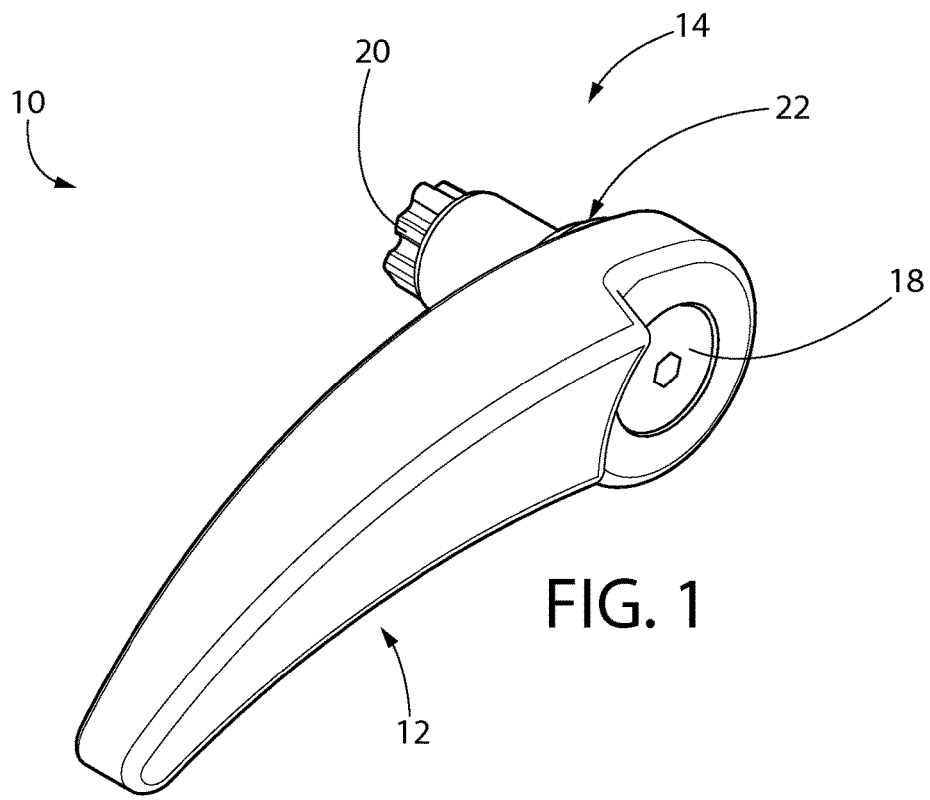
FIG. 1 is a front perspective view of a vehicle saddlebag latch assembly in accordance with aspects of the present disclosure.

Reference is now made to FIG. 1, which shows an embodiment of the present invention featuring a saddlebag latch assembly 10 that allows access to an interior space of a saddlebag. The saddlebag latch assembly 10 shown in FIG. 1 includes a handle member 12, a shaft member 14 rotatable about an axis 16, and a fastener 18 to couple the handle member 12 to the shaft member 14. Other coupling means, including but not limited to adhesives, welds, rivets, interference fitted structure or magnets, may be provided in accordance with the present disclosure to couple the handle member 12 to the shaft member 14. The shaft member 14 is also referred to herein as a saddlebag latch device.

Figure 3:
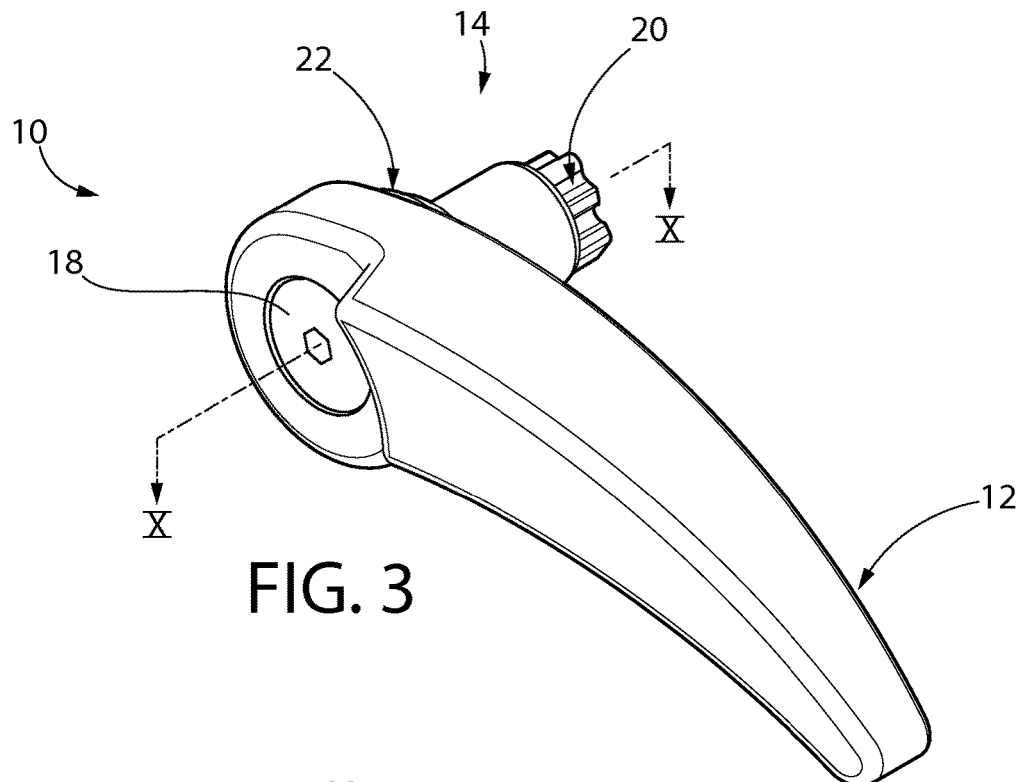
FIG. 3 is a front perspective view of a vehicle saddlebag latch assembly in accordance with aspects of the present disclosure.
Figure 4:
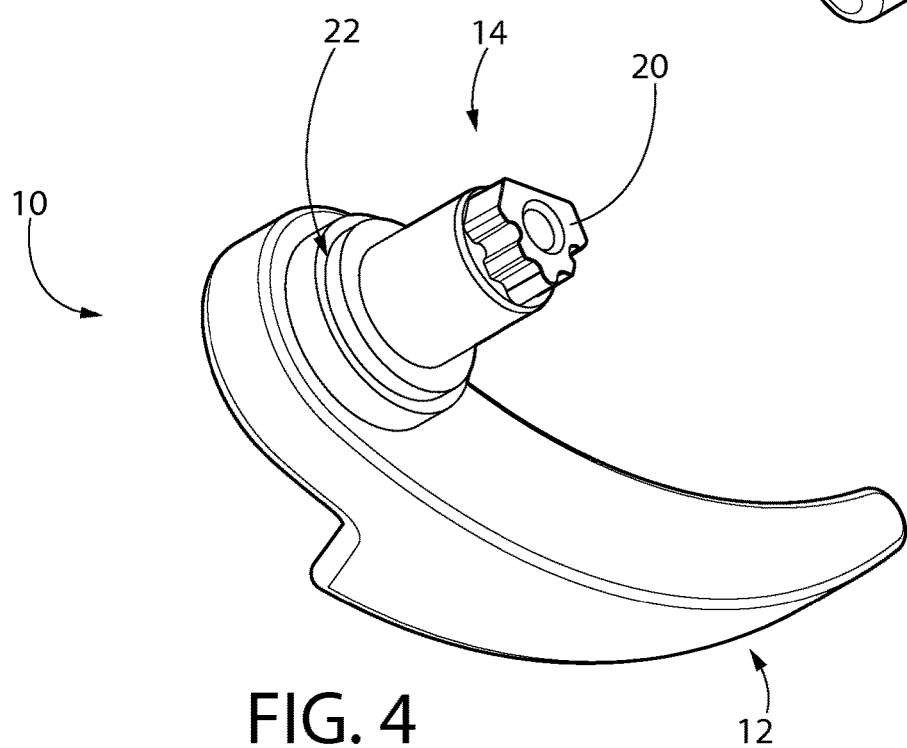
FIG. 4 is a rear perspective view of a vehicle saddlebag latch assembly in accordance with aspects of the present disclosure.

FIGS. 3 and 4 show the saddlebag latch assembly 10 of the present invention being structural oriented to accommodate reverse handle direction or assembly with a second saddlebag disposed on an opposite side of the vehicle.

Figure 2:
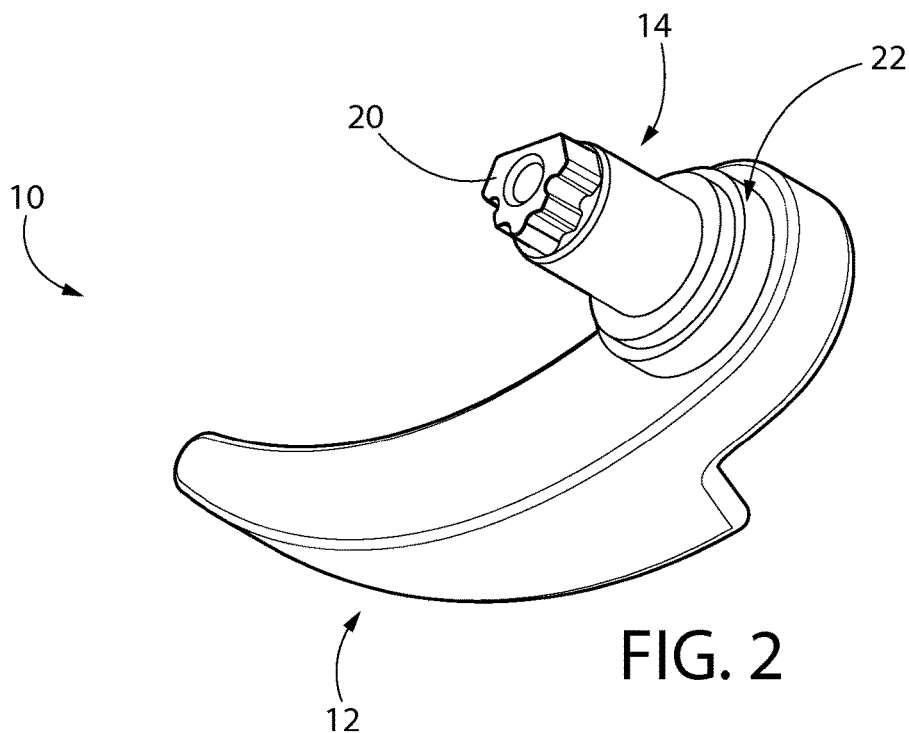
FIG. 2 is a rear perspective view of a vehicle saddlebag latch assembly in accordance with aspects of the present disclosure.

As more clearly shown in FIGS. 2 and 4, and as further described below with regard to FIG. 11, the shaft member 14 of one embodiment of the present disclosure includes a first end portion 20 for positioning at an interior location of a saddlebag lid and a second end portion 22 distal from the first end portion 20 for positioning at an exterior location of the saddlebag lid. The first end portion 20 shown in FIGS. 2 and 4 is coupled to a latch mechanism such that rotation of the shaft member 14 results in operation of the latch mechanism to allow opening of the saddlebag lid.

Figure 7:
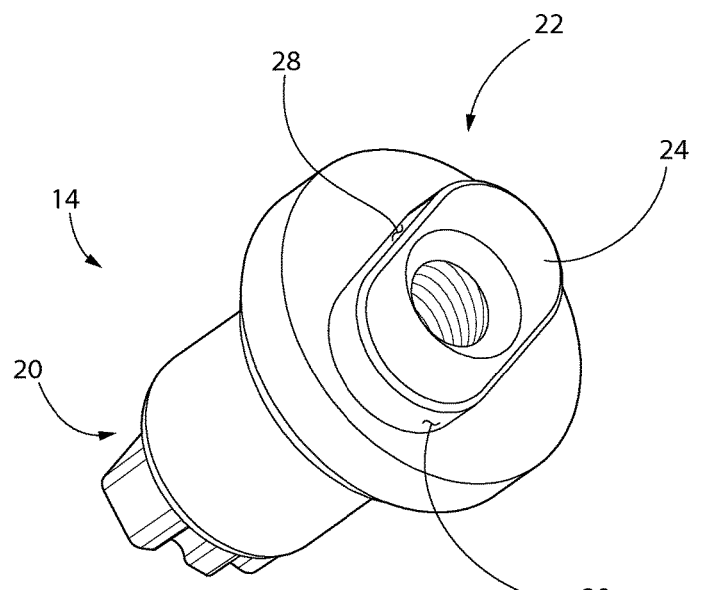
FIG. 7 is a front perspective view of a vehicle saddlebag latch device in accordance with aspects of the present disclosure.
Figures 8, 9:
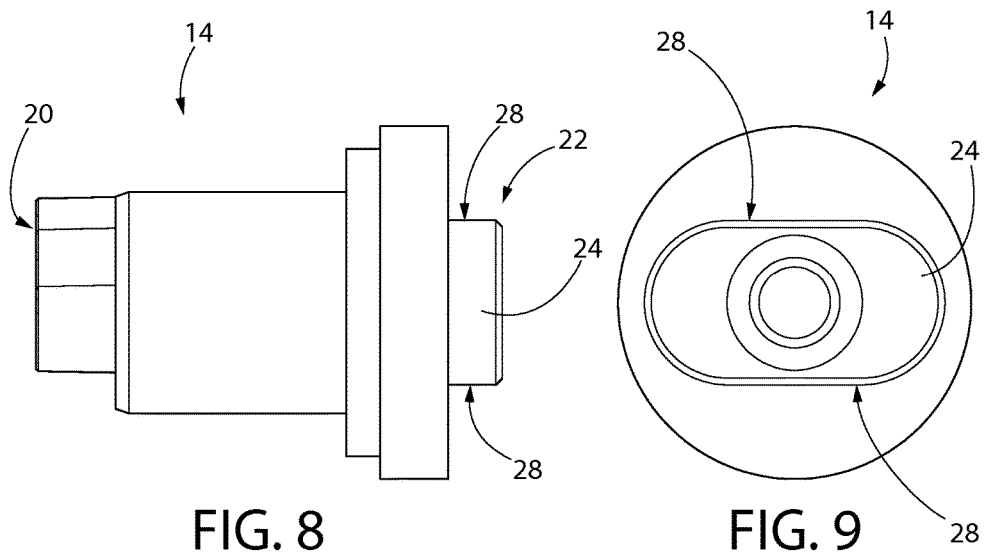
FIG. 8 is a side plan view of a vehicle saddlebag latch device in accordance with aspects of the present disclosure.
FIG. 9 is a front plan view of a vehicle saddlebag latch device in accordance with aspects of the present disclosure.

Referring now to FIGS. 7-9, the saddlebag latch device shaft member 14 is shown in isolation. The second end portion 22 of the present embodiment includes a handle protrusion or second end protrusion 24 extending generally in a direction parallel with the axis 16 in the disclosed embodiment. The second end protrusion 24 has a rounded shape that further extends in a lateral or transverse direction that is perpendicular to the axis 16.

Figure 5:
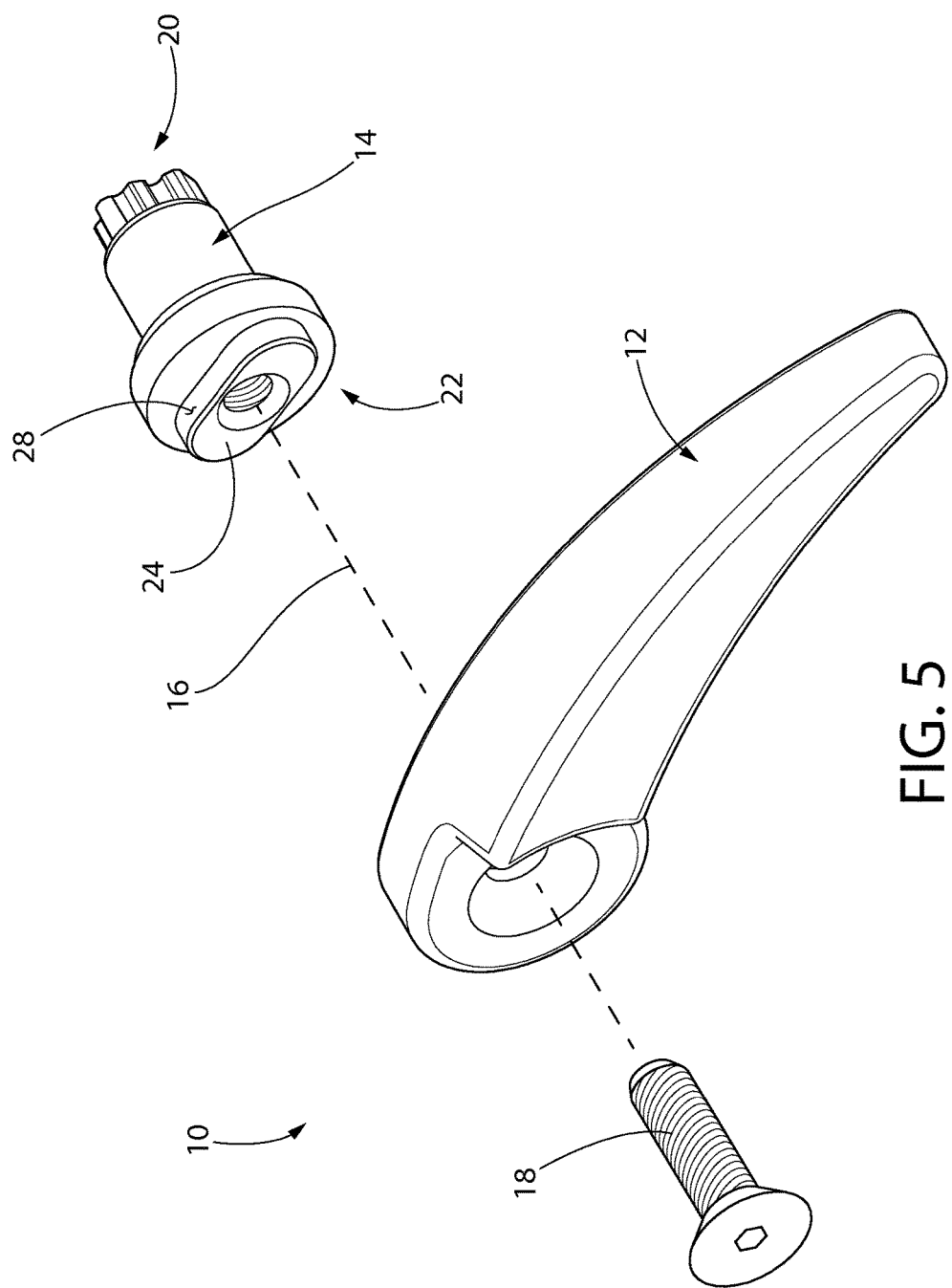
FIG. 5 is a front perspective view of a vehicle saddlebag latch assembly in accordance with aspects of the present disclosure.
Figure 6:
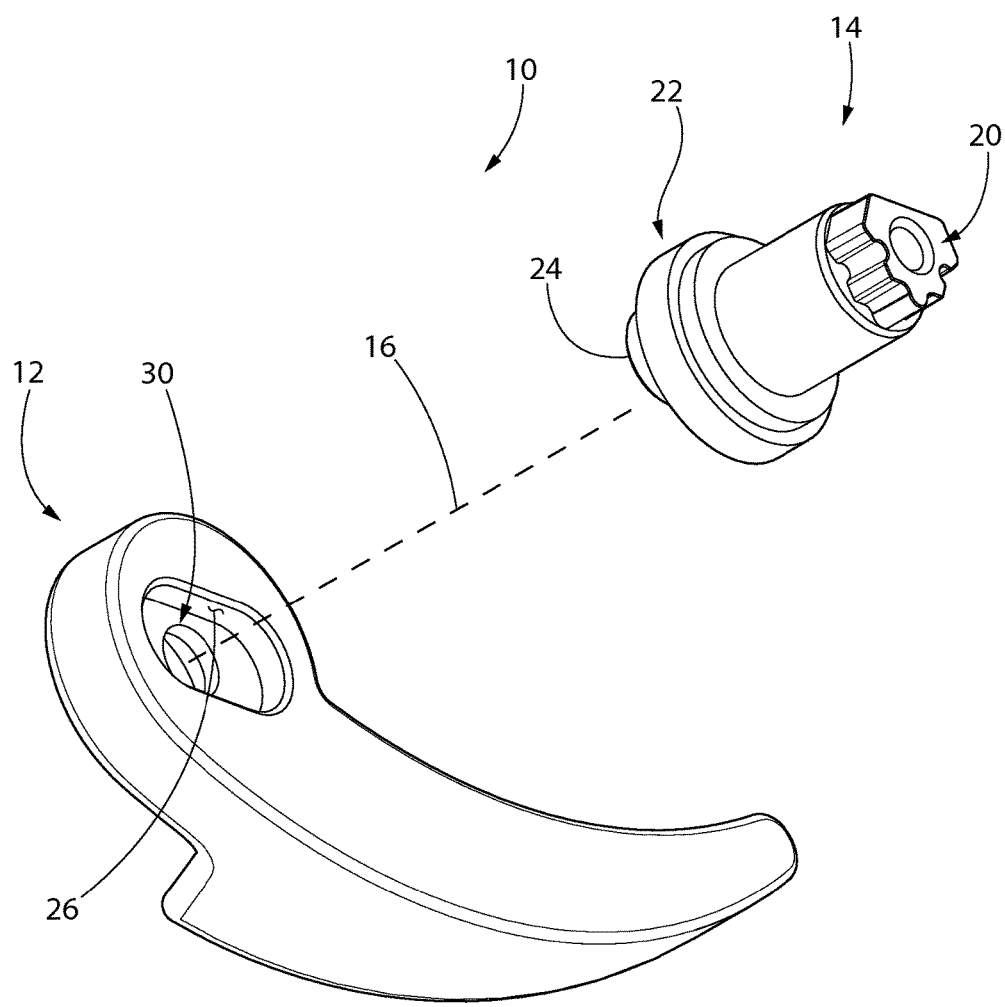
FIG. 6 is a front perspective view of a vehicle saddlebag latch assembly in accordance with aspects of the present disclosure.

Referring now to FIGS. 5 and 6, the protrusion 24 engages the handle member 12 through a recess 30 extending in a direction parallel with the axis 16. The recess 30 has one or more first engagement surfaces 26 which engage one or more second engagement surfaces 28 of the shaft member 14 such that rotation of the handle member 12 about the axis 16 causes rotation of the shaft member 14. As a result of the shaft member 14 rotating, the latch mechanism is actuated and the lid is able to be opened to access the interior space of the saddlebag. The first engagement surface 26 of the present disclosure includes two transversely separated surfaces to engage the protrusion 24 of the shaft member 14 at two transversely separated locations.

Figure 10:
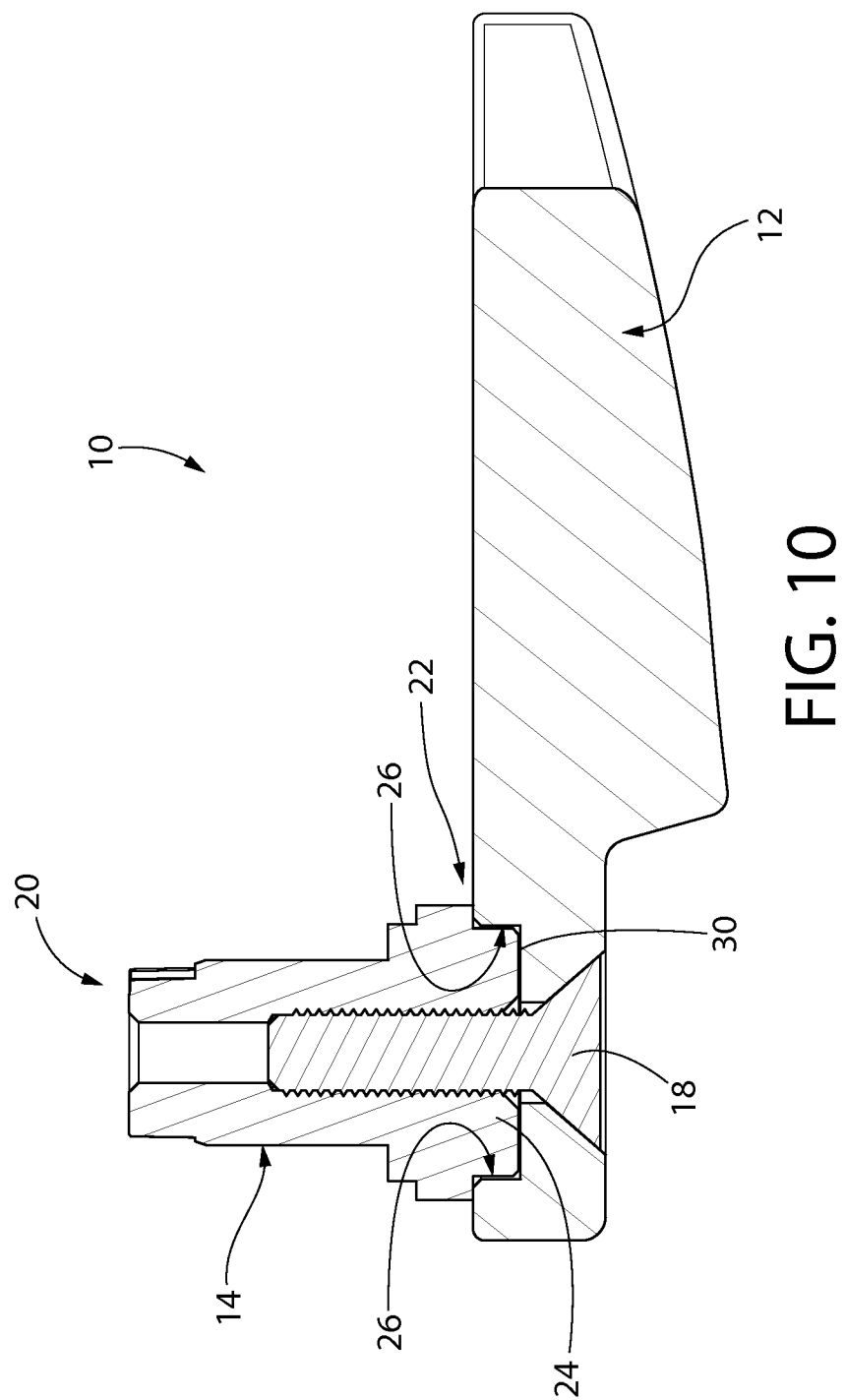
FIG. 10 is a top cross sectional view of a vehicle saddlebag latch assembly in accordance with aspects of the present disclosure.

FIG. 10 shows the saddlebag latch assembly in its assembled state following coupling, as sectioned along line X-X of FIG. 3. The one or more second engagement surfaces 28 of the protrusion 24 of the shaft member 14 of the present disclosure engages the one or more first engagement surfaces 26 of the handle member 12 such that rotation of the handle member about the axis 16 causes rotation of the shaft member 14. Because handle member 12 is separately removable and replaceable from the remaining saddlebag latch assembly, handle member 12 may be advantageously replaced with a different structural component resulting in ease of repair, enhanced ergonomics, added functionality, and customization of the saddlebag.

Figure 11:
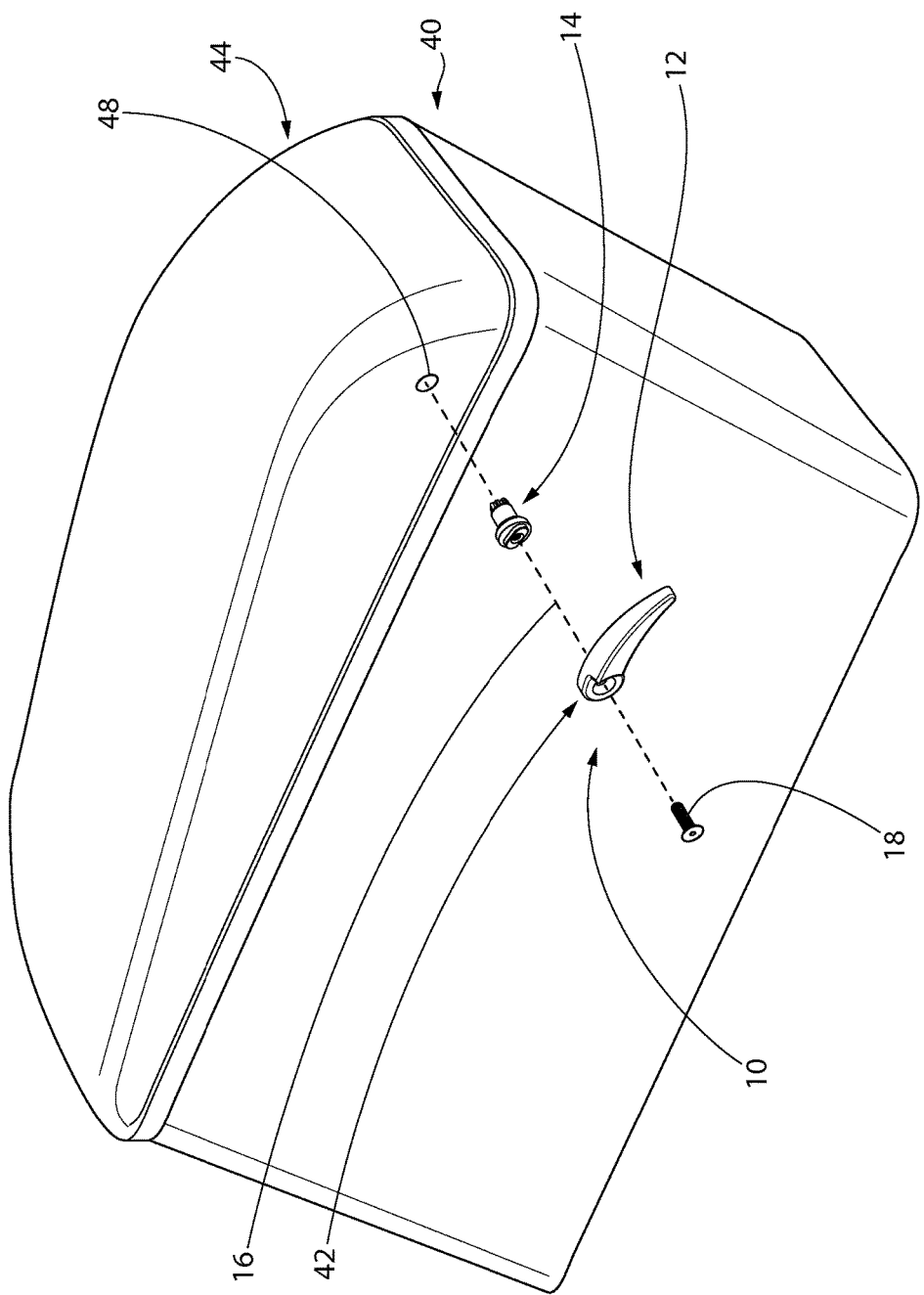
FIG. 11 is a front perspective view of a vehicle saddlebag latch assembly in accordance with aspects of the present disclosure.

Referring now to FIG. 11, the present disclosure further includes a method of coupling the handle member 12 to a shaft member 14 to form a saddlebag latch assembly 10 and to allow access to an interior space of a saddlebag 40. In accordance with the present invention, one embodiment of the method includes inserting the shaft member 14 through a portion of a saddlebag 40, such as a hole 48 in the saddlebag lid 44. Insertion of the shaft member 14 results in the first end portion 20, also referred to herein as a latch mechanism attachment portion, as shown in FIG. 10, being disposed at an inside location of the saddlebag 40 and the second end portion 22, as shown in FIG. 10, being disposed at an outside location of the saddlebag 40. With coupling means, such as the fastener 18, an attachment portion 42 of the handle member 12 is coupled to the protrusion 24 of the shaft member 14, as best shown in FIG. 10, such that rotation of the handle member 12 about the axis 16 causes rotation of the latch mechanism attachment portion or first end portion 20.

Figure 13B:
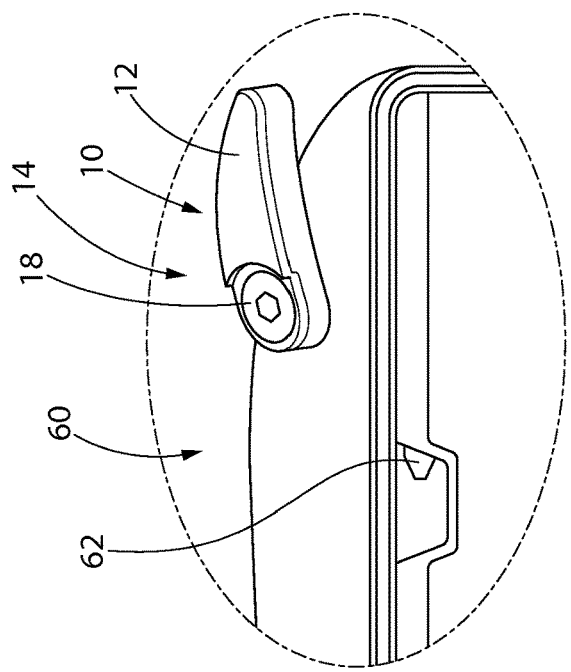
FIG. 13B is an enlarged top perspective view of a vehicle saddlebag latch assembly in accordance with aspects of the present disclosure.
Figure 13A:
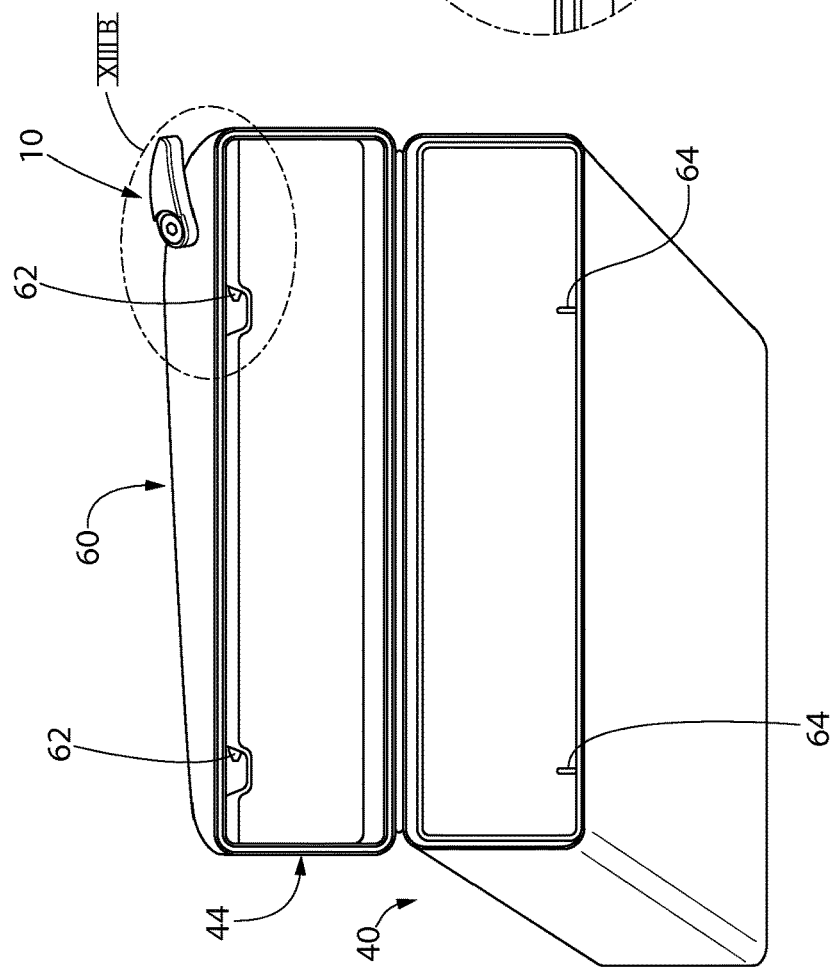
FIG. 13A is a top perspective view of a vehicle saddlebag latch assembly in accordance with aspects of the present disclosure.

Referring now to FIGS. 12A, 12B, 13A, and 13B, a saddlebag latch assembly 10 including a latch mechanism 60 according to further aspects of the present disclosure is shown. The latch mechanism 60 of the present disclosure features at least one securing member 62 to maintain a closed state of the saddlebag 40. As shown in FIGS. 12B and 13B, rotation of the handle member 12 and shaft member 14 results in the operation of the latch mechanism 60 to allow opening of the saddlebag lid 44. FIGS. 12A and 12B show the latch mechanism 60 in a closed state to secure the saddlebag lid 44 to the lower portion of the saddlebag 40, and FIGS. 13A and 13B show the latch mechanism 60 in an open state to allow opening of the saddlebag lid 44. The latch mechanism 60 of the present disclosure shown in FIGS. 12A and 13A includes two securing members 62 that extend in a longitudinal direction substantially perpendicular to the rotational axis of the handle member 12 and shaft member 14. Securing members 62 engage one or more anchor members 64. As shown in FIGS. 12B and 13B, securing members 62 move within the saddlebag lid 44 in order to release the saddlebag lid 44 from engagement with two anchor members 64.

The structure and operation of the latch mechanism 60 is similar to the saddlebag lid mechanism featured in the saddlebags of such touring class motorcycles as the 2014 Harley-Davidson FLHX. The latch mechanism 60 may have a rod (not shown) extending between the two securing members 62 shown in FIGS. 12 and 13. The rotary operation of the shaft member 14 may rotate an interior saddlebag actuation arm (not shown) to reversibly extend the securing members 62, which are at least partially fixed for longitudinal movement by the rod. The number, location, or arrangement of the one or more securing members 62 or the one or more anchor members 64 or the parts, structure, or operation of the latch mechanism 60 is not limited to the present disclosure and may include any number, location, operation, structure, or arrangement as contemplated by one having ordinary skill in the art.

Among other advantages, the device, assembly, and method of the present disclosure provide the advantages of a simplified and more efficient manufacturing process, improved assembly and repair processes, and enhanced interchangeability and customization of the vehicle. In particular, typical saddlebag lid handle devices may comprise a complicated one-piece structure that is only efficiently produced using a cast method of fabrication. The saddlebag latch components and assembly of the present disclosure may be fabricated using many different manufacturing methods such as billet machining or lathe turning with less waste as compared to typical single-piece handle and shaft devices. The fabrication advantages of the devices and assemblies of the present disclosure result in faster and more efficient manufacturing and the opportunity to use more diverse materials for construction.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

I claim:

1. A system for allowing access to an interior space of a saddlebag, said system comprising:
    a saddlebag lid capable of encasing an interior space of the saddlebag;
    a saddlebag latch device including;
        a shaft member rotatable about an axis, said shaft member comprising
            a first end portion for positioning at an interior location of said saddlebag lid; and
            a second end portion distal from said first end portion for positioning at an exterior location of said saddlebag lid, said second end portion comprising a handle protrusion and at least one surface configured to engage a handle member such that rotation of said handle member about said axis causes rotation of said shaft member;
    wherein the saddlebag latch device is operably coupled to a latch mechanism such that rotation of the shaft member about said axis engages the latch mechanism in an open state capable of allowing access to the interior space of the saddlebag or a closed state.

2. The system of claim 1, wherein said handle protrusion extends in a direction parallel with said axis.

3. The system of claim 2, wherein said handle protrusion further extends in a direction transverse to said axis to engage said handle member such that rotation of said handle member about said axis causes rotation of said shaft member.

4. The system of claim 3, wherein said at least one surface comprises two transversely separated surfaces to engage said handle member at two transversely separated locations.

5. An assembly allowing access to an interior space of a saddlebag, said assembly comprising:
    a saddlebag lid capable of encasing an interior space of the saddlebag;
    a saddlebag latch assembly including;
        a handle member comprising at least one first engagement surface; and
        a shaft member rotatable about an axis and comprising
            a first end portion for positioning at an interior location of said saddlebag lid; and
            a second end portion distal from said first end portion for positioning at an exterior location of said saddlebag lid, said second end portion comprising a second end protrusion and at least one second engagement surface configured to engage said at least one first engagement surface of said handle member such that rotation of said handle member about said axis causes rotation of said shaft member;
    wherein the saddlebag latch assembly is operably coupled to a latch mechanism such that rotation of the shaft member about said axis engages the latch mechanism in an open state capable of allowing access to the interior space of the saddlebag or a closed state.

6. The assembly of claim 5, wherein said second end protrusion extends in a direction parallel with said axis.

7. The assembly of claim 6, wherein said second end protrusion further extends in a direction transverse to said axis to engage said handle member such that rotation of said handle member about said axis causes rotation of said shaft member.

8. The assembly of claim 6, wherein said handle member further comprises a recess extending in a direction parallel with said axis, wherein said recess comprises said at least one first engagement surface.

9. The assembly of claim 8, wherein said recess comprises two engagement surfaces to engage two transversely separated second end protrusion engagement surfaces.

10. The assembly of claim 5, further comprising a latch mechanism having at least one securing member to maintain a closed state of said saddlebag, wherein rotation of said shaft member results in operation of said latch mechanism to allow opening of said saddlebag lid.

11. The assembly of claim 10, wherein said latch mechanism comprises at least two securing members each extendable in a direction substantially perpendicular to said axis to releasably engage at least two anchor members.

12. A latch assembly for use with a saddlebag, the latch assembly comprising:
    a shaft member rotatable about an axis having a length extending in a direction parallel to the axis, including;
        a first end portion to be coupled to a latch mechanism of a saddlebag lid such that rotation of the shaft member about the axis engages the latch mechanism in an open state capable of allowing access to an interior space of a saddlebag or in a closed state;

a second end portion having a handle protrusion extending in the direction of the axis, where the handle protrusion includes a second engagement surface;

a middle portion having an interior section and an exterior section, where the interior section is disposed between the first end portion and the exterior section, and where the exterior section is disposed between the second end portion and the interior section;

a handle member rotatable about the axis including:

a recess for receiving the handle protrusion, the recess including a first engagement surface;

wherein the first engagement surface engages the second engagement surface such that rotation of the handle about the axis causes rotation of the shaft member about the axis;

wherein the handle member is removably attached to the shaft member by a fastener that couples to the shaft member and extends into a handle member aperture;

wherein an interior section width is less than an exterior section width;

wherein the interior section is capable of being received by a hole in the saddlebag lid;

wherein the exterior section is configured to be coupled to a saddlebag lid such that the second end portion is disposed at an outside location of the saddlebag lid; and wherein a handle protrusion width is smaller than the exterior section width.

13. The latch assembly of claim 12, wherein the handle protrusion is rounded in shape.

14. The latch assembly of claim 12, wherein the recess has a substantially similar shape to the handle protrusion.

15. The latch assembly of claim 12, wherein the fastener extends in a direction parallel to the axis and couples to the shaft member by extending into a shaft member aperture.

16. The latch assembly of claim 12, wherein the fastener extends in a direction that is not parallel to the axis and couples to the shaft member by friction between the fastener and the shaft member.

17. The latch assembly of claim 12, wherein a first end portion width is smaller than the interior section width.

* * * * *